Nov. 8, 1960  J. CASPAR ET AL  2,959,000
RAM JET CONTROL SYSTEM
Filed Oct. 31, 1955
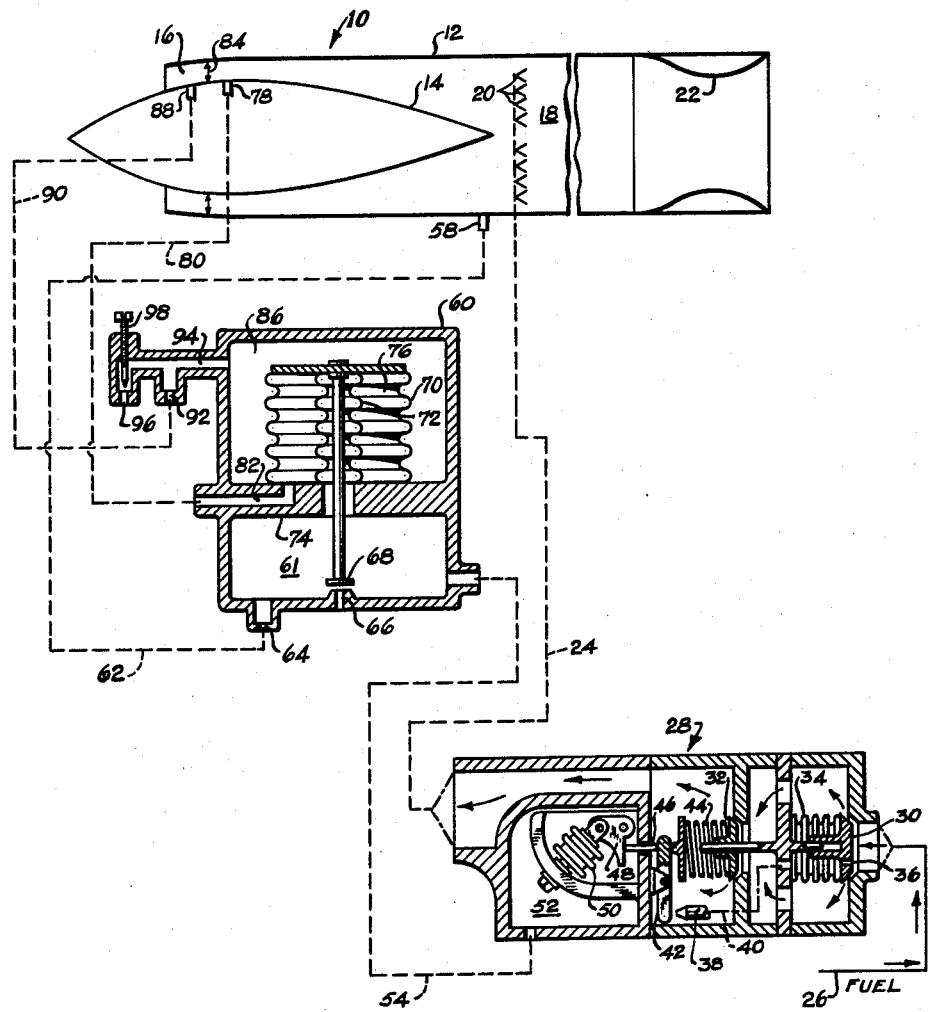
INVENTORS.
JOHN CASPAR
HOWARD D. HOFFMAN
BY
ATTORNEY

United States Patent Office 2,959,000
Patented Nov. 8, 1960

2,959,000

RAM JET CONTROL SYSTEM

John Caspar, Verona, and Howard D. Hoffman, Fair Lawn, N.J., assignors to Curtiss-Wright Corporation, a corporation of Delaware Filed Oct. 31, 1955, Ser. No. 543,882

7 Claims. (Cl. 60—35.6)

This invention relates to aircraft jet engines and is particularly directed to a control system for such an engine.

The invention is primarily designed for use with a ram-jet engine. Such an engine comprises a duct-like structure having a forwardly directed air inlet at its forward end, a rearwardly directed exhaust nozzle at its aft end and a combustion chamber intermediate said ends. The thrust of a ram-jet engine increases with increase in the rate at which air enters the engine and the more efficiently said air is used the lower the specific fuel consumption (fuel consumption per unit thrust output) of the engine. It is generally desirable therefore that a ram-jet engine operate so that there is as high a conversion as possible of the air inlet entering velocity to pressure, that is, at as high a pressure recovery of said inlet as possible. At supersonic flight speeds air enters the ram-jet inlet at supersonic velocities but the velocity entering the engine combustion chamber is subsonic. Accordingly a strong or normal shock wave exists in the inlet at the transition region from supersonic to subsonic flow and in general this shock wave is at or downstream of the inlet throat.

It is known that the static pressure downstream of said strong inlet shock wave is substantially higher than the pressure upstream therefrom. The actual position of this strong shock wave in the engine inlet can be controlled by varying the magnitude of the pressure on its downstream side. Any increase in the resistance to flow through the engine downstream of said shock wave, for example as a result of an increase in the fuel-air ratio of the engine fuel supply or of a closing adjustment of the engine exhaust nozzle, causes an increase in the pressure on the downstream side of said strong shock wave whereupon this shock wave moves to a more upstream position. Likewise any decrease in said flow resistance causes a decrease in said downstream pressure whereupon said strong shock wave moves to a more downstream position. Thus the inlet pressure recovery increases and decreases with movement of said strong shock wave in upstream and downstream directions respectively in the inlet.

For stable operation, the inlet strong shock wave (marking the transition between supersonic and subsonic flow) should be disposed at the ram-jet inlet throat or downstream therefrom. If the inlet is operating at too high a pressure recovery, the high pressure downstream of the shock wave causes the shock wave to move completely out of the inlet whereupon a portion of the approaching air, which would otherwise enter the inlet, spills out around the inlet. As a result of this air spillage the air flow into the engine decreases whereupon the pressure drops within the engine and the shock wave moves back into the inlet. As the shock wave moves back into the inlet, the pressure on its downstream side will again increase to said high value again causing said shock wave to move upstream out of the inlet. Accordingly it is apparent that if the inlet of a ram-jet engine operates at too high a pressure recovery the position of the inlet strong shock wave may become unstable and oscillate back and forth into and out of the inlet. This type of aerodynamic instability of an engine air inlet is generally known as "buzz" and is highly undesirable because of the severe pressure fluctuations resulting from rapid oscillation of the inlet shock wave. This phenomenon of buzz is not confined to ram-jet engines. Buzz may occur in any jet engine which takes in air at supersonic velocity.

An object of the invention comprises the provision of a novel jet engine control system which automatically provides for operation of the engine at high inlet pressure recovery without danger of inlet buzz. A further object of the invention comprises the provision of a novel jet engine control system in which the engine fuel supply is controlled in proportion to a signal which is a measure of the engine mass air flow and this proportion is modulated within predetermined limits in response to a signal which is indicative of the inlet pressure recovery.

It has been found that the static pressure in the inlet downstream of the inlet throat changes with movements of the strong inlet shock wave marking the transition from supersonic to subsonic flow. This pressure, however, also varies with such flight factors as flight Mach number, inlet angle of attack, inlet angle of yaw and altitude. It has also been found that other pressures such as a static or total pressure in the inlet upstream of the inlet throat vary similarly with said flight factors but are independent of changes in the position of said shock wave. Accordingly the ratio of such latter pressure and said downstream inlet pressure can be used to sense the position of the inlet shock wave independent of changes in said flight factors. Hence a further object of the invention comprises the provision of a novel jet engine control system in which said pressure ratio is utilized to control the position of said inlet shock wave so that said shock wave is maintained substantially at the position for maximum inlet pressure recovery without danger of inlet buzz. A still further object of the invention comprises the provision of such a jet engine control system in which the basic regulation of the engine fuel supply in response to an air flow signal is modulated, within limits, in response to deviations in said pressure ratio from a predetermined value.

Other objects of the invention will become apparent upon reading the annexed detailed description in connection with the drawing which is a schematic view of a ram jet engine embodying the invention.

The invention has been illustrated in connection with a ram jet engine. As will be apparent, however, the invention is not so limited.

Referring to the drawing, a ram jet engine is schematically indicated at 10. As illustrated, the engine 10 comprises a duct-like member 12 within which a centerbody 14 is co-axially mounted. The centerbody 14 is disposed at the forward end of the duct member 12 to provide an annular air inlet passage 16. The duct member 12 has a combustion chamber 18 intermediate its ends, said chamber having flame holder and burner apparatus, schematically indicated at 20 for stabilizing combustion downstream therefrom. Fuel, for combustion with air entering the inlet 16, is supplied to the combustion chamber 18, this fuel being introduced into the duct member 12 at the flame holder and burner apparatus 20, as illustrated, or upstream therefrom. An exhaust nozzle 22 is provided at the rear end of the duct member 12 through which the exhaust gases from the combustion chamber discharge rearwardly into the surrounding atmosphere to provide the engine with forward propulsive thrust. Obviously the area of the nozzle 22 may be adjustable.

Fuel is supplied to the burner apparatus 20 through a fuel line 24 from a fuel pressure supply line 26 under control of a fuel regulating device 28 which preferably is similar to that fully disclosed in copending application Serial No. 286,364, filed May 6, 1952. As schematically illustrated in the drawing, the fuel regulating device 28 includes a main valve 30 and an auxiliary valve 32 disposed in series with and downstream of said main valve. The main valve 30 is supported by and is urged in a valve closing direction by an elastically flexible bellows-type diaphragm 34 the interior of which communicates with the upstream side of main valve through a restricted passage 36. A nozzle 38 has its upstream side communicating with the interior of the bellows 34 via a passage 40 such that a small quantity of fuel flows through the restriction 36 and discharges through the nozzle 38 into the fuel passage of the regulator 28 downstream of the auxiliary valve 32. One end of a lever 42 overlies the discharge end of the nozzle 38 to function as a baffle member for said nozzle. A spring 44 is disposed between the lever 42 and the auxiliary valve 32 so as to urge the lever 42 in a nozzle closing direction and to urge the valve 32 in a closing direction against the fuel pressure differential across said valve. The force of the spring 44 on the lever 42 is opposed by a second force transmitted thereagainst by a pin 46 from a lever 48 and bellows-type flexible diaphragm 50. The bellows 50 is disposed in a closed chamber 52 to which a control pressure ($Pc$) is transmitted by a passage 54.

With this construction of the fuel regulating device 28, if, for example, the control pressure in the chamber 52 acting against the bellows 50 increases, the lever 42 moves away from the nozzle 38 to effect an opening adjustment of said nozzle to increase the leakage fuel flow therethrough. This increase in fuel flow through the nozzle 38 increases the fuel pressure drop across the restriction 36 thereby increasing the valve opening fluid pressure force acting on the main valve 30 against the elasticity of the bellows 34. The main valve 30 thereupon opens to increase the fuel flow until the resulting increase in the fuel pressure differential on the auxiliary valve 32 is such that the increase in the force exerted by said auxiliary valve 32 on the lever 42 through the spring 44 rebalances the forces on the lever 48. In this way, as more fully explained in said copending application, the lever 42 is subjected to the force of the spring 44 which is a measure of the fuel flow past the valve 32 and said lever is subjected to a control force transmitted thereagainst by the pin 46 and in response to unbalance of the torque on said lever, the fuel regulating device 28 regulates the fuel flow therethrough to the combustion chamber 18 in proportion to the magnitude of the control pressure in the fuel regulator chamber 52.

The control pressure $Pc$ in the fuel regulator chamber 52 is obtained from a static pressure tube 58 in the combustion chamber 18 under control of a mechanism 60. The pressure tube 58 preferably is disposed upstream of the flame holder apparatus 20 in said combustion chamber because of the relatively low temperatures in this region. This pressure ($Pb$) at the entrance to the combustion chamber burner is a measure of the mass rate of air flow through the engine, said pressure being directly proportional to said mass air flow rate for a given fuel-air ratio of the engine combustion mixture with the proportionality constant depending primarily on the magnitude of said fuel-air ratio.

The pressure tube 58 is connected to a chamber 61 in the control mechanism 60 by a passage 62 having a restriction 64. The chamber 61 has a restricted opening 66 under control of a movable valve element 68. The opening 66 bleeds air into the surrounding atmosphere, the flow path of the bleed air being from the pressure tap 58 through the passage 62 and its restriction 64 thence into the chamber 61 and out through the restricted opening 66. Accordingly, for a given position of the valve element 68 the pressure in the chamber 61 is proportional to the pressure $Pb$ supplied thereto from the combustion chamber pressure tap 58 through the restriction 64. The pressure in the chamber 61 is supplied by the passage 54 as the control pressure to the fuel regulator 28. Hence the fuel regulator control pressure $Pc$ is equal to $CPb$ where $C$ is a fraction whose value is constant for each position of the valve element 68. If the pressure drop across the restricted opening 66 is above the critical pressure ratio the magnitude of the fraction $C$ is independent of the changes in the pressure of the surrounding atmosphere into which the opening 66 discharges.

The movable valve element 68 is connected to the movable end of a bellows-type flexible diaphragm 70. The other end of said bellows 70 is connected to a partition 74 having an opening through which the stem of the valve 68 extends. A second bellows 72 is co-axially disposed about the bellows 70, the bellows 72 having its movable end connected to the movable end of the bellows 70 and having its other end connected to the partition 74 thereby forming a chamber 76 between said bellows. The bellows chamber 74 is in communication with a static pressure tap 78 via line 80 and a passage 82 in the partition 74. The static pressure tap 78 communicates with the ram-jet inlet passage 16 at a point downstream of the inlet throat (indicated at 84) whereby the chamber 76 is subjected to the static pressure $P1$ measured by the tap 78.

The chamber 86 outside the outer bellows 72 is in communication with a second static pressure tap 88 via a passage 90, a restriction 92 and a line 94, said pressure tap 88 communicating with the ram-jet inlet passage 16 at a point upstream of the inlet throat 84. In addition the passage 90 is in communication with the surrounding atmosphere via a restriction 96, a valve 98 being provided for adjusting the restriction 96. With this arrangement the chamber 86 is subjected to a pressure proportional to the pressure $P2$ measured by the static pressure tap 88. That is the pressure in the chamber 86 is equal to $KP2$ where $K$ is a constant of proportionality determined by the initial setting of the valve 98.

The pressure tap 78 is disposed downstream of the inlet throat 84 in the region the inlet strong shock wave is found when the inlet is operating at the desired pressure recovery, said shock wave marking the transition from supersonic to subsonic flow. At the substantially maximum pressure recovery normally desired, this shock region would be only a short distance downstream of the inlet throat. The pressure measured by the tap 78 not only depends on the position of the inlet shock wave but also on such flight factors as flight Mach number, inlet angle of attack, inlet angle of yaw and altitude. The pressure tap 88 is disposed at a point upstream of the inlet throat such that the pressure measured by said tap is independent of the position of the shock wave downstream of the inlet throat but varies with said flight factors in a manner similar to the pressure of the tap 78. As will be apparent any other pressure, for example total pressure of the entering air upstream of the inlet throat, which varies with said flight factors in a similar manner, could be used in lieu of the pressure measured by the tap 88.

The strong inlet shock wave marking the transition from supersonic to subsonic flow actually extends over a substantial region of the inlet. Thus with stable operation of the inlet at or near maximum pressure recovery said shock region actually may extend upstream of the inlet throat 84. In any given inlet the pressure tap 78 is located in the desired region of said shock so that there is no precise point at which said pressure tap is located. In accordance with the invention it is desired to operate the inlet substantially at maximum inlet pressure recovery without danger of inlet buzz and therefore the pressure tap 78 is located sufficiently close and in general somewhat downstream of the inlet throat to provide for inlet operation substantially at maximum inlet pressure recovery without danger of inlet buzz.

With the aforedescribed structure for each position of the valve 68, the fuel regulator control pressure Pc is a particular fraction of the burner entrance pressure Pb. Since the pressure Pb is proportional to the mass air flow into the engine combustion chamber and since the fuel regulator 28 maintains the fuel flow to the engine proportional to the pressure Pc the magnitude of the fuel-air ratio maintained by the fuel regulator 28 depends on the position of the valve 68. The position of the valve 68 depends on the ratio of the pressures P1 to KP2 and the magnitude of this ratio depends on the pressure recovery of the air inlet 16 whereby the position of said valve is a measure of said pressure recovery. With air inlet operating so that the shock wave marking the transition from supersonic flow to subsonic flow is downstream of the inlet throat, if the inlet pressure recovery should increase from the desired value the ratio of the pressure P1 to KP2 increases to raise the valve 68 thereby providing an opening adjustment of the restricted opening 66 to lower the control pressure Pc to the fuel regulator 28. Since the fuel regulator 28 maintains the fuel flow regulator 28. Since the fuel regulator 28 maintains the fuel flow proportional to the control pressure Pc, this opening adjustment of the valve 68 in response to an increase in the inlet pressure recovery results in a decrease in the fuel-air ratio of the combustion mixture supplied to the engine combustion chamber 18. This decrease in the engine fuel-air ratio results in a decrease in the inlet pressure recovery toward the desired value. The fuel regulator control pressures Pc also acts on the inside of the bellows 72 so that said decrease in the pressure Pc provides an immediate follow-up closing adjustment of the valve 68. This immediate follow-up return adjustment of the valve 68 by the pressure Pc tends to prevent hunting of the control system.

Likewise an increase in the inlet pressure recovery results in a decrease in the pressure ratio of P1 to KP2 thereby causing a closing adjustment of the valve 68. The closing adjustment results in an increase in the fuel regulator control pressure Pc thereby causing an increase in the engine fuel-air ratio whereupon the inlet pressure recovery increases toward the desired value. At the same time the increase in the control pressure Pc acts on the inside of the bellows 72 to provide an immediate follow-up opening adjustment of the valve 68.

From the above description it is apparent that the system provides for a basic fuel control in proportion to a pressure signal Pc which in turn is proportional to the mass air flow into the engine. The control mechanism 60 modulates or modifies this basic fuel control in response to the ratio of the pressures P1 to KP2, this latter signal being a measure of the inlet pressure recovery whereby said basic fuel control is modified to vary the engine fuel-air ratio to maintain a predetermined inlet pressure recovery. Since the valve 68 determines the fuel-air ratio of the engine combustion mixture maintained by the fuel regulator 28, the limits of the fuel-air ratio are automatically determined by the limiting positions of the valve 68. Hence the control system can be designed so that the engine always operates within desired fuel-air ratio limits.

The pressure Pb at the ram-jet burner entrance is not the only pressure available for providing a measure of the mass air flow into the engine. For example the impact pressure measured by a total head tube directed upstream in the free air stream relative to the engine is also a measure of said mass air flow into the engine. The pressure Pb not only is a better measure of said air flow but said pressure Pb has the advantage in that, because it is low when the combustion flame is out, the use of the pressure Pb tends to prevent excessive inlet recovery pressure overshoot when combustion is initiated.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications.

We claim as our invention:

1. Control apparatus for an aircraft jet engine having an air inlet having a throat portion adjacent to its upstream end through which air enters the engine at supersonic velocity for combustion therein during engine operation; said apparatus comprising means providing a fluid under a pressure which is a measure of the mass air flow into said engine; said means including a passageway for flow of said fluid therethrough and having a pair of restrictions, the one being downstream of the other; valve means operable to modify the fluid pressure in said passageway between said restrictions by varying the magnitude of one of said restrictions; means including means responsive to a condition downstream of the inlet throat for adjusting the position of said valve means in response to changes in the pressure recovery of said inlet; and engine fuel regulating mechanism including means providing a force which is a measure of the supply of fuel to the engine and including means responsive to said force and to the pressure between said restrictions for regulating said fuel supply in proportion to said latter pressure so that the fuel-air ratio of the combustible mixture supplied to the engine increases and decreases with decrease and increase respectively of the inlet pressure recovery.

2. Control apparatus for an aircraft ram-jet engine having a combustion chamber and having an air inlet with a throat portion adjacent to its upstream end through which, during engine operation, air enters the engine at supersonic velocity for combustion in said chamber; said apparatus comprising means responsive to the static pressure in said inlet at a point adjacent to and downstream of the inlet throat; means providing a signal which is a measure of the mass air flow into said engine; means responsive to said pressure for modifying said signal; and fuel regulating mechanism for said chamber including means providing a signal which is a measure of the fuel supply to the engine combustion chamber and including means responsive to said fuel supply signal and to said modified signal for regulating said fuel supply such that an increase in said pressure is effective to cause a decrease in the fuel-air ratio of the combustible mixture supplied to said chamber.

3. Control apparatus for an aircraft ram-jet engine having a combustion chamber and having an air inlet with a throat portion adjacent to its upstream end through which, during engine operation, air enters the engine at supersonic velocity for combustion in said chamber; said apparatus comprising means responsive to the static pressure in said inlet at a point adjacent to and downstream of the inlet throat; means providing a signal which is a measure of the mass air flow into said engine; means responsive to said pressure for modifying said air flow signal by increasing and decreasing said signal with decrease and increase respectively in said pressure; and fuel regulating mechanism for said chamber including means providing a signal which is a measure of the fuel supply to the engine combustion chamber and including means responsive to said fuel supply signal and to said modified signal for regulating said fuel supply in proportion to said modified signal whereby the fuel-air ratio of the combustible mixture supplied to said chamber decreases and increases with increase and decrease respectively in said pressure.

4. Control apparatus for an aircraft ram-jet engine having a combustion chamber and having an air inlet with a throat portion adjacent to its upstream end through which, during engine operation, air enters the engine at supersonic velocity for combustion in said chamber; said apparatus comprising means responsive to the static pressure in said inlet at a point adjacent to but downstream of the inlet throat; means responsive to a second pressure such that the ratio of said static and second pressures is indicative of the inlet pressure recovery; means providing a fluid flow path for communication of its upstream end with the entrance end of said combustion chamber and having a pair of serially disposed restrictions; valve means responsive to changes in the relative magnitude of said pressures for varying one of said restrictions such that an increase in said first pressure tends to cause a decrease in the pressure between said restrictions; and fuel regulating mechanism for said chamber including means providing a force which is a measure of the supply of fuel to said combustion chamber and including means responsive to said force and to the pressure between said restrictions for regulating the fuel supply to said chamber in proportion to said latter pressure so that the fuel-air ratio of the combustible mixture supplied to said chamber increases and decreases with decrease and increase respectively of the inlet pressure recovery.

5. Control apparatus for an aircraft ram-jet engine having a combustion chamber and having an air inlet with a throat portion adjacent to its upstream end through which, during engine operation, air enters the engine at supersonic velocity for combustion in said chamber; said apparatus comprising means for providing a first pressure proportional to the static pressure of the inlet air at a point downstream of the inlet throat and for providing a second pressure derived from the inlet air such that the ratio of said first and second pressures is indicative of the inlet pressure recovery; means providing a fluid flow path for communication of its upstream end with the entrance end of said combustion chamber and having a pair of serially disposed restrictions; valve means responsive to changes in the relative magnitude of said first and second pressures for varying one of said restrictions so as to increase and decrease the pressure between said restrictions with decrease and increase, respectively, in the inlet pressure recovery; and fuel regulating means responsive to the pressure between said restrictions for controlling the supply of fuel to said engine in proportion to said latter pressure.

6. Control apparatus for an aircraft jet engine having an air inlet having a throat portion adjacent to its upstream end through which, during engine operation, air enters the engine at supersonic velocity for combustion therein; said apparatus comprising means providing a signal which is a measure of the air flow into the engine; means including means responsive to a condition downstream of the inlet throat for modifying said signal in response to changes in the pressure recovery of the inlet; and engine fuel regulating mechanism including means providing a signal which is a measure of the supply of fuel to the engine and including means responsive to said fuel supply signal and to said modified signal for regulating said fuel supply in proportion to said modified signal so that the fuel-air ratio of the engine combustible mixture increases and decreases with decrease and increase respectively of the inlet pressure recovery.

7. Control apparatus for an aircraft jet engine having a combustion chamber and having an air inlet having a throat portion adjacent to its upstream end for supplying air from the surrounding atmosphere, said inlet being arranged for supersonic entering air flow with the resulting shock wave marking the transition from supersonic to subsonic flow positioned within the inlet; said apparatus comprising means providing a signal which is a measure of the air flow into said engine combustion chamber; means including means responsive to a condition downstream of the inlet throat for modifying said signal by increasing and decreasing said signal in response to decrease and increase respectively in the pressure recovery of said inlet; and fuel regulating mechanism for said chamber including means providing a signal which is a measure of the fuel supply to said chamber and including means responsive to said fuel supply signal and to said modified signal for regulating said fuel supply such that an increase or decrease in said modified signal results in an increase or decrease respectively in said fuel supply whereby increases and decreases in said inlet pressure recovery are effective to decrease and increase respectively the fuel-air ratio of the combustible mixture supplied to said chamber.

References Cited in the file of this patent

UNITED STATES PATENTS

| | | |
|---|---|---|
| 2,540,594 | Price | Feb. 6, 1951 |
| 2,638,738 | Salter | May 19, 1953 |
| 2,796,730 | Lawrence | June 25, 1957 |

OTHER REFERENCES

"Engine Intake Controls," Flight, Dec. 27, 1957, vol. 77, No. 2553, pp. 1000, 1001, 1002.

"Some Fundamental Aspects of Ramjet Propulsion," Jet Propulsion, published by The American Rocket Society, April 1957, vol. 27, No. 4, pp. 381 to 385, pp. 383 to 385 pertinent.